(12) United States Patent
Choi et al.

(10) Patent No.: US 10,185,802 B2
(45) Date of Patent: Jan. 22, 2019

(54) METHOD FOR DESIGN AND CUSTOMIZATION OF A MULTIPHASE ELECTRIC MOTOR

(71) Applicants: Seungdeog Choi, Fairlawn, OH (US); Sai Sudheer Reddy Bonthu, Akron, OH (US)

(72) Inventors: Seungdeog Choi, Fairlawn, OH (US); Sai Sudheer Reddy Bonthu, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 402 days.

(21) Appl. No.: 14/825,834

(22) Filed: Aug. 13, 2015

(65) Prior Publication Data
US 2016/0048630 A1    Feb. 18, 2016

Related U.S. Application Data

(60) Provisional application No. 62/036,665, filed on Aug. 13, 2014.

(51) Int. Cl.
*G06F 7/60* (2006.01)
*G06F 17/10* (2006.01)
*G06F 17/50* (2006.01)

(52) U.S. Cl.
CPC ...... *G06F 17/5086* (2013.01); *G06F 17/5009* (2013.01); *G06F 2217/08* (2013.01); *Y02T 10/82* (2013.01)

(58) Field of Classification Search
None
See application file for complete search history.

(56) References Cited

PUBLICATIONS

Baek, Jeihoon et al., "Optimal Design and Performance Analysis of Permanent Magnet Assisted Synchronous Reluctance Portable Generators", Feb. 13, 2013, Journal of Magnetics 18.*
Rong, Ruowen et al., "Applying Response Surface Methodology in the Design and Optimization of Electromagnetic Devices", Mar. 1997, IEEE Transactions on Magnetics, vol. 33, No. 2, IEEE.*

\* cited by examiner

*Primary Examiner* — Cedric Johnson
(74) *Attorney, Agent, or Firm* — Renner Kenner Greive Bobak Taylor and Weber; Ray L. Weber, Esq.; Timothy A. Hodgkiss, Esq.

(57) ABSTRACT

A method for designing and customizing a multiphase motor provides reduced modeling and customization time by utilizing a lumped parameter model (LPM) of the multiphase motor. In addition, during the design process, environmental factors, monitoring results of multiphase motors used in the field, market requirements, and the particular application for which the multiphase motor is to be used are all taken into account by the design method. Thus, by considering such factors together with the LPM of the multiphase motor allows the method of the present invention to optimize the overall design of the multiphase motor so that is achieves high reliability, high efficiency, and low cost.

8 Claims, 7 Drawing Sheets

METHOD FOR DESIGN AND CUSTOMIZATION OF A MULTIPHASE ELECTRIC MOTOR

CROSS-REFERENCE TO RELATED APPLICATION

This application claims the benefit of U.S. Provisional Application No. 62/036,665 filed Aug. 13, 2014, the contents of which are incorporated herein by reference.

TECHNICAL FIELD

Generally, the present invention relates to multiphase electric motors. Particularly, the present invention relates to a method of designing multiphase electric motors. More particularly, the present invention relates to a method of designing and customizing multiphase electric motors with reduced simulation time, using a lumped parameter model (LPM).

BACKGROUND OF THE INVENTION

The design of electric motors through the use of finite element analysis (FEA) requires a substantial amount of simulation time. For example, to develop an optimized motor design, thousands of design evaluations are required, which in some cases takes more than one month to simulate. Thus, it would be desirable to have a method for designing an electric motor that requires a reduced amount of simulation time.

Furthermore, motor and generator (MAG) systems have been extensively applied in critical service areas, including transportation, medical and military systems, where such electric motors are used for electric propulsion/motoring, energy generation, emergency backup power, and the like. The operation of MAGs in critical energy service areas need to be continuously and reliably monitored and predictably maintained. For example, there have been circumstances, where well-maintained diesel power generators that are used to supply emergency energy to systems used to cool nuclear power plants have failed unexpectedly. Additionally, there are still continuous reports of system failures in the case of extremely high power wind turbine generators and high power electrical systems, which have been deployed. Thus, the monitoring systems of MAGs in such critical service areas have failed to provide a suitably comprehensive service to prevent such disasters. Furthermore, the failure of critical service systems may be catastrophic to the power grid and the public as a whole. Thus, if there were a cyber system that could understand the deterioration and able to predict the remaining operating life of physical MAG systems, then such disastrous failures of emergency systems could be prevented.

Therefore, there is a need for a method of designing and customizing a multiphase electric motor using a design and customization algorithm that utilizes reduced simulation time. Furthermore, there is a need for a method of designing and customizing a multiphase electric motor that utilizes or considers environmental factors, such as regional natural disasters that affect the reliability, humidity that affects the load profile of the motor and external temperature that affects the operational efficiency of the electric motor system. In addition, there is a need for a method that generates a five-phase LPM (lumped parameter model) for a multi-phase electric motor, such as a PMa-Syn RM (permanent magnet assisted synchronous reluctance motor).

SUMMARY OF THE INVENTION

In light of the foregoing, it is a first aspect of the present invention to provide a method for designing and customizing a multiphase electric motor comprising the steps of selecting a candidate electric motor design; determining whether the candidate electric motor design meets one or more physical constraints; calculating operating performance parameters using a lumped parameter model (LPM) of the candidate electric motor design if the one or more predetermined physical constraints are met at the determining step; determining whether the performance parameters of the candidate electric motor design meet or exceed one or more predetermined operating performance values; evaluating an objective function based on the candidate electric motor design if the one or more operating performance values are met or exceeded at the determining step; and storing the candidate electric motor design.

BRIEF DESCRIPTION OF THE DRAWINGS

These and other features and advantages of the present invention will become better understood with regard to the following description, appended claims, and accompanying drawings, wherein:

DETAILED DESCRIPTION OF THE INVENTION

Figure 1A:
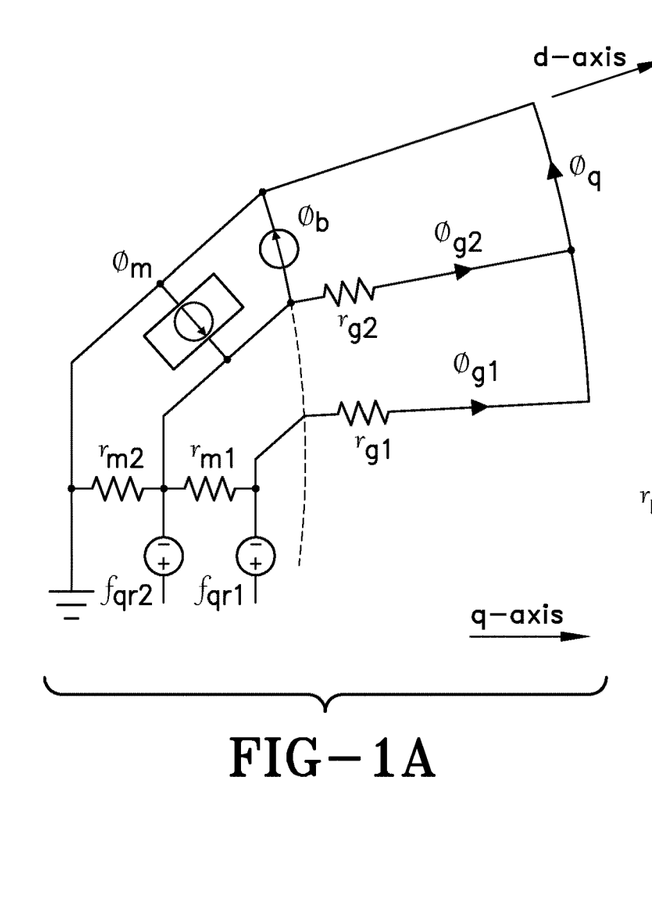
FIGS. 1A-B are schematic views of a generated d-axis and q-axis lumped parameter model (LPM) in accordance with the concepts of the present invention.
Figure 1B:
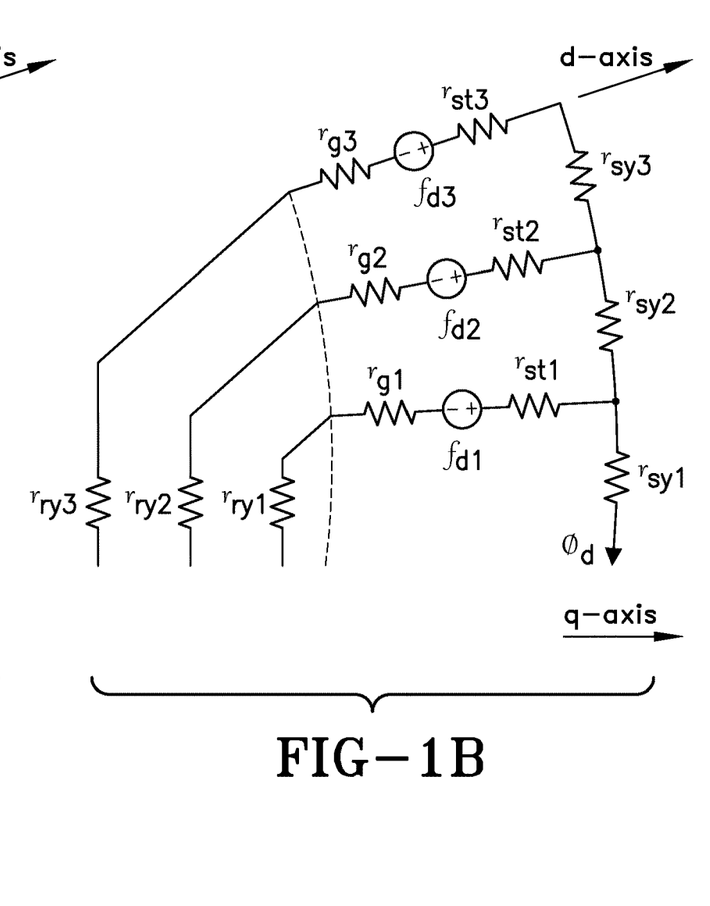

A lumped parameter model (LPM) for a multiphase electric motor, such as a permanent magnet assisted synchronous reluctance motor or machine (PMa-SynRM), is used by the present invention for fast prototyping, including design and customization of a motor design. It should be appreciated that while the following discussion relates to a PMa-SynRM motor, such as a five-phase PMa-SynRM, the method of the present invention may be used for designing any multiphase electric motor, such as a multiphase-interior permanent magnet motor (IPM) or synchronous reluctance motor (SynRm) for example. Continuing, the LPM model is a magnetic equivalent circuit model that is used for calculating electric motor parameters. Thus, the method of the present invention utilizes the lumped parameter model circuit, shown in FIG. 1, to generate circuit parameters which are listed in Table 1 below.

TABLE 1

Magnetic Equivalent Circuit Parameters
of the LPM model shown in FIG. 1

| Circuit Parameters | Explanation |
| --- | --- |
| $\phi_{gi}$ | The air gap flux that flows through the stator teeth |
| $\phi_m$ and $\phi_b$ | The PM flux source and estimated saturation flux source that are opposite in direction in the magnetic circuit |
| $r_{gi}$ and $r_{mi}$ | The reluctance in the air gap and flux barriers |
| $f_{qri}$ and $f_{di}$ | The magnetic potentials with respect to the q and d axes |
| $r_{sti}$, $r_{syi}$, $r_{ryi}$, and $r_{gi}$ | The stator core reluctances and rotor core reluctances where i $\in$ $\{1, 2, 3 \ldots n\}$ and n is the number of slots considered |

It should be appreciated that the lumped parameter model (LPM) allows for low or reduced computation time for carrying out the motor design/customization method of the present invention. A 5D, (i.e. 5 dimension) customization method of the present invention is set forth as follows, such that 5D customization=3D design+1D time domain optimization+1D environmental factor.

Thus, the 5D dimension customization of the multiphase electric motor or machine of the present invention is performed by considering environmental factors or the operating environment in which the motor will be used. Such operating environments in which of the electric motor may be used includes, but is not limited to: high power electric vehicles, lower power electric vehicles, high performance electric bikes, elevators, and fans. In addition, the 5D customization method of the present invention may also consider other environmental factors, such as the regional environment in which the motor will be operated, as well as other environmental factors, including but not limited to: hot temperature/weather, cold temperature/weather, and humid weather. Furthermore, the 5D customization method of the present invention may also consider environmental factors, such as the level of reliability that is required by the intended electric motor application.

An objective function is utilized for the customization of the design of the electric motor, for which an example is as follows:

$$\sqrt{(k_1 \cdot \text{Machine } loss^2 + k_2 \cdot \text{Machine } cost^2 + k_3 \cdot \text{Torque } ripple^2)}, \quad \text{(Eq. 1)}.$$

The objective function defined by Eq. 1 is configured by using motor/machine (i.e. loss) efficiency, motor/machine cost and motor torque ripple as a penalty function. The weighting coefficients $k_1$, $k_2$ and $k_3$ of the objective function are multiplied to adjust the importance of the multiple criteria in the objective function. Furthermore, the weighting coefficients $k_1$, $k_2$ and $k_3$ of the objective function of Eq. 1 may be obtained using a process 10 shown in FIG. 2. Specifically, the process 10 for identifying the weighting coefficients of the objective function (Eq. 1) begins initially at step 100, whereby a monitoring system acquires monitoring result data 110 and environmental factor data 120. The monitoring system may acquire such information or data 110, 120 using any suitable computer system that is configured to acquire data. In one aspect, the monitoring system may utilize a wired or wireless communication system to communicate with a remote computing system to acquire the data discussed above. It should be appreciated that the computer system may be a web-based monitoring system that acquires the monitoring result data and the environmental factor data via a LAN (local area network) or WAN (wide area network), such as the Internet, using either a wired or wireless communication connection or interface.

Figure 3:
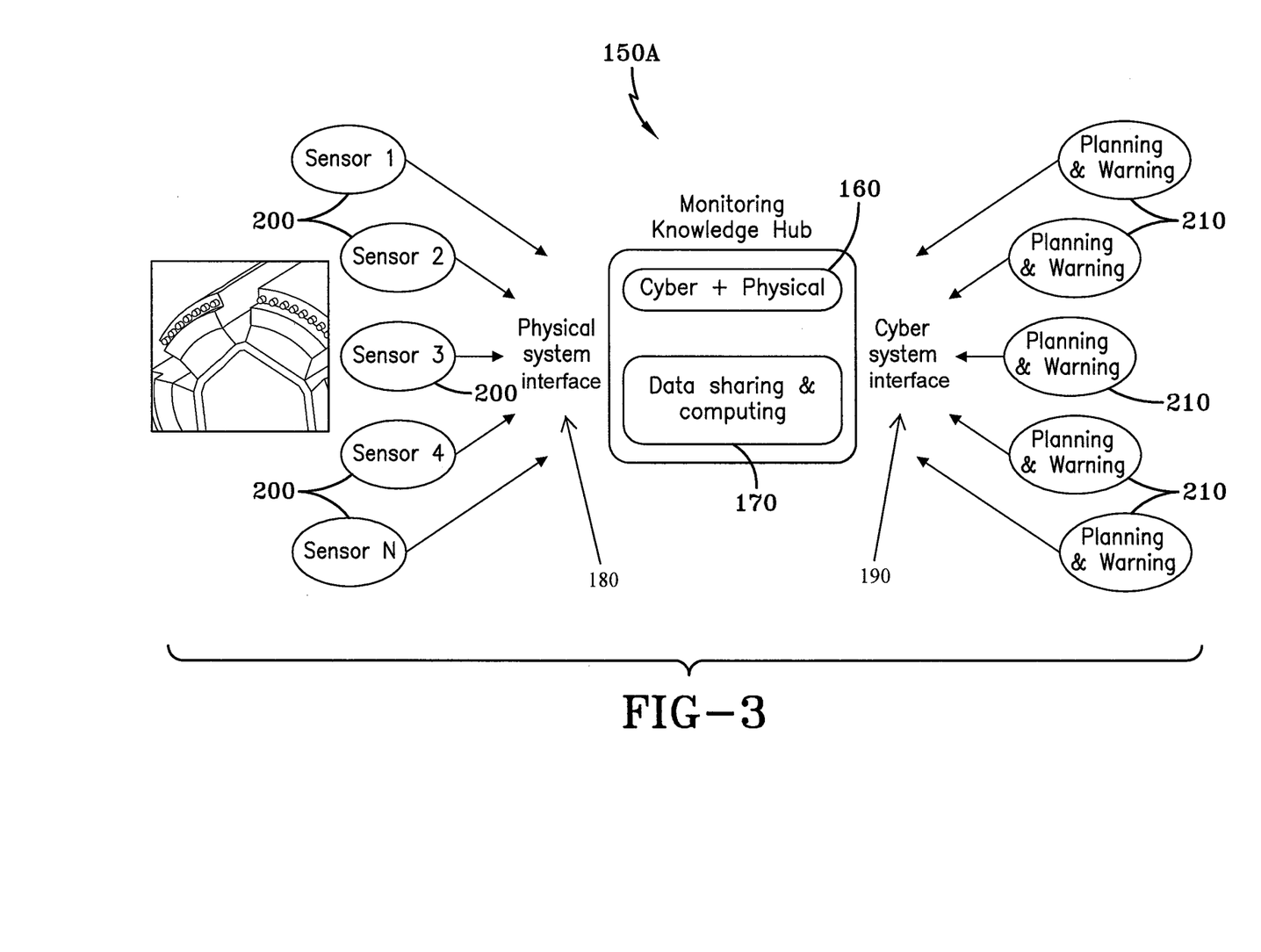
FIG. 3 is a block diagram showing a monitoring knowledge hub 1 for obtaining monitoring results in FIG. 2 in accordance with the concepts of the present invention.

It should be appreciated that in some embodiments, the monitoring result data 110 collected at step 100 may be obtained at step 100 using a web-based monitoring knowledge hub or system 150A, such as that shown in FIG. 3. In particular, the knowledge hub 150A includes a cyber and physical component 160 and a data sharing and computing component 170. It should be appreciated that the components 160 and 170 may be embodied by any suitable computing system that has the necessary hardware, software or combination thereof to carryout the functions to be discussed. Furthermore, the knowledge hub 150A includes a physical system interface 180 and a cyber system interface 190. As such, the physical system side 180 of the knowledge hub 150A acquires data from a plurality of sensors 200 that are configured to monitor various operating parameters and characteristics of one or more multiphase motors 210 operating in the field. In addition, the cyber system interface 190 of the knowledge hub 150A acquires data from planning and warning components 210.

Figure 4:
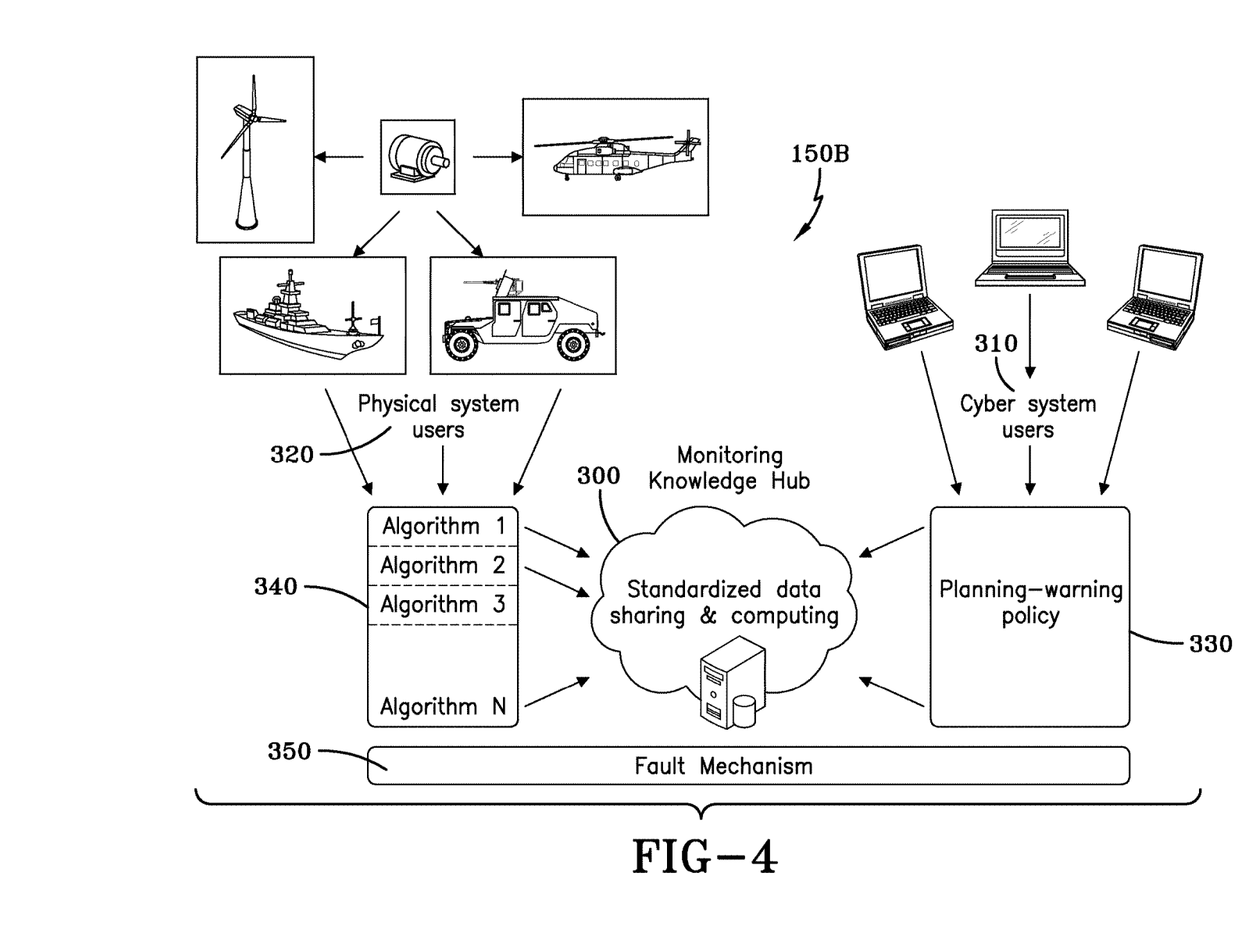
FIG. 4 is a block diagram showing a monitoring knowledge hub 2 for obtaining monitoring results in FIG. 2 in accordance with the concepts of the present invention.

It should be appreciated that in other embodiments, the monitoring result data 110 that is acquired at step 100 may be obtained using a web-based monitoring knowledge hub or system 150B, such as that shown in FIG. 4. Specifically, the knowledge hub or system 150B includes a standardized data sharing and computing system 300. The knowledge hub or system 150B receives data from cyber system users 310 and physical system users 320. In addition, the data from the physical system users 320 includes data relating to operation of the motors and devices that use the motors in the field. Specifically, the data from the cyber system users 310 relates to a planning and warning policy 330, whereby such data is acquired and processed by the knowledge hub 150B. In addition, the data from the physical system users 320 is processed by one or more processing algorithms 340 before the data is acquired and processed by the knowledge hub 150B. In addition, a fault mechanism or component 350 is provided by the knowledge hub 150B.

Figure 5A:
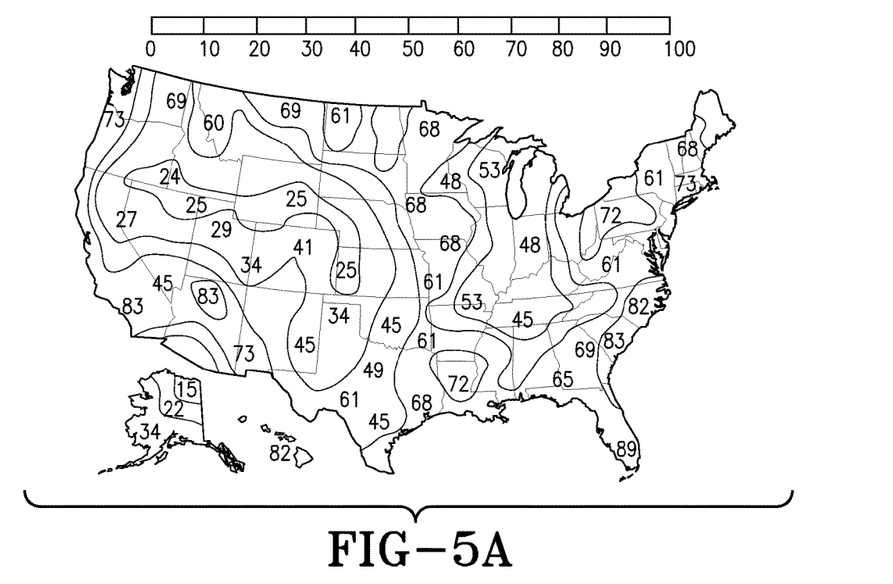
FIG. 5A is a graphical view of a humidity map for assessing environmental factors in FIG. 2 in accordance with the concepts of the present invention.
Figure 5B:
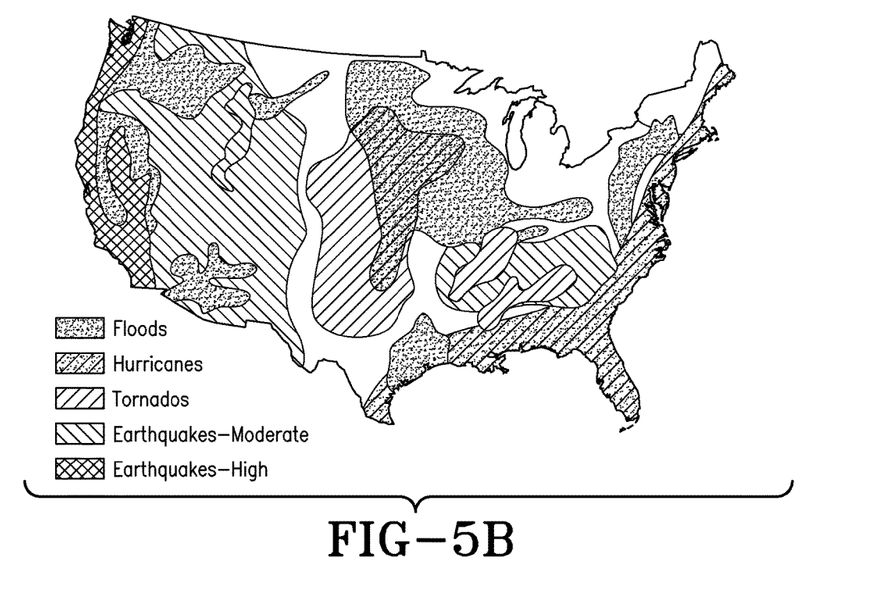
FIG. 5B is a graphical view of a natural disaster map for assessing environmental factors in FIG. 2 in accordance with the concepts of the present invention.

In addition, the environmental factor data 120 used by step 100 of the weighting process 10 may be acquired from any suitable data source. For example, motor and generator (MAG) systems have been extensively applied to critical energy services, such as transportation, medical, and military systems for electric propulsion/motoring, energy generation, emergency backup powering, etc. Thus, environmental factor data 120, which are used by step 100 of the process 10, include but are not limited to the occurrence of regional natural disasters, humidity, and temperature, and are considered when customizing the design of the multiphase motor for operation in a particular region or for use in a particular operational application. Furthermore, FIGS. 5A-B show maps of humidity and natural disasters respectively, as a reference to customize the multi-phase motor for operation under specific environmental factors. It should also be appreciated that the optimization of the design of the multi-phase motor is critical in the design and management of a micro-grid when seeking to achieve enhanced reliability and efficiency, as the electric motor consumes more than approximately 60% of the energy in a micro-grid.

Figure 2:
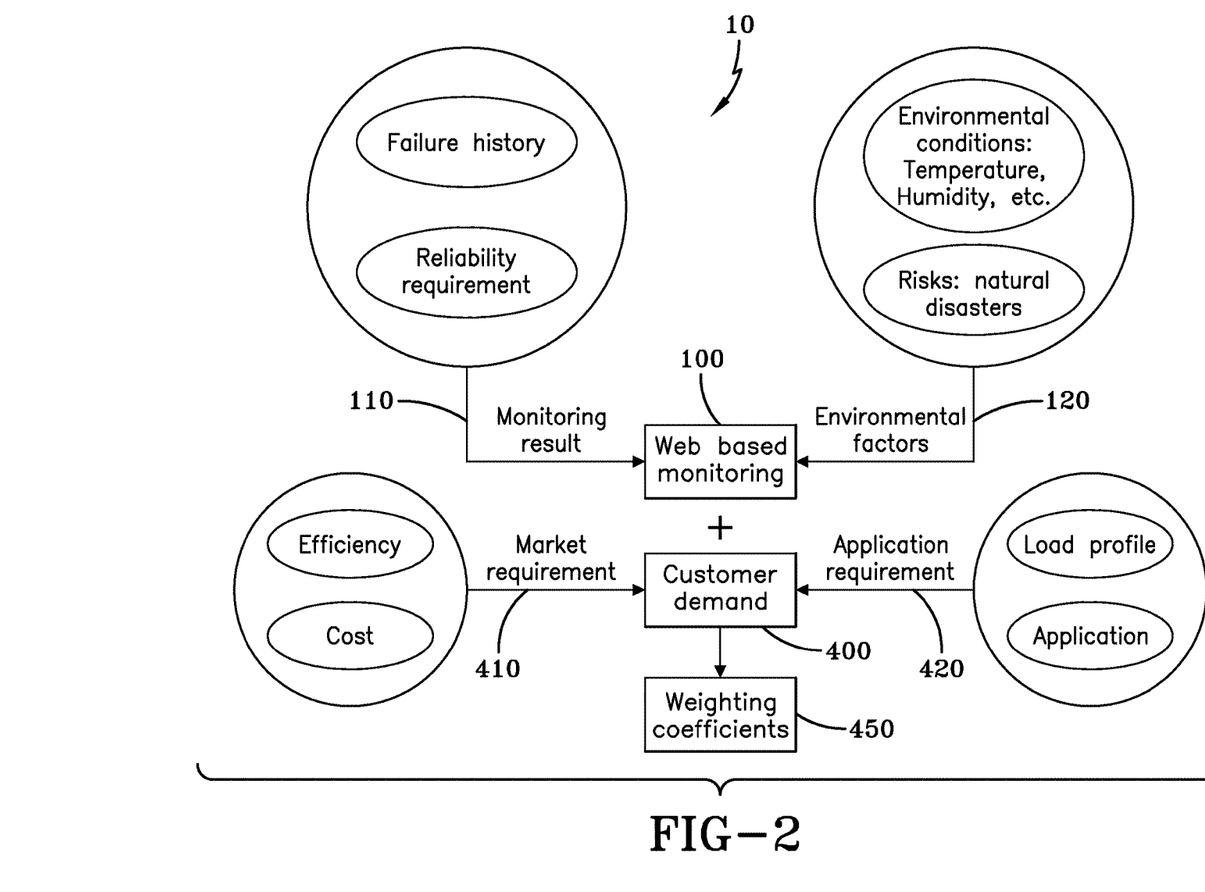
FIG. 2 is a block diagram showing the design of weighting coefficients in a cost function for customization in accordance with the concepts of the present invention.

Returning to the weighting process 10, once the monitored data of step 110 is collected, and the environmental factor data 120 is collected at step 100, the data 110,120 is input to step 400, whereby customer demand is evaluated using market requirement data 410 and application requirement data 420. For example, the market requirement data 410 may include, but is not limited to efficiency and cost data, for example; while the application requirement data 420 may include, but is not limited to load profile data and application data, for example. Next, at step 450, the process 10 generates the weighting coefficients for the objective function of Eq. 1 based on the combination of the monitoring data processed at step 100 and the customer demand data processed at step 400.

It should be appreciated that the market requirement data 410 is based on the premise that customer or consumer market segments, such as electric motor manufacturers and automotive industries, require electric motors that have higher efficiency and lower cost. To satisfy this market requirement, the weighting factors enable the optimal design of the motor to be the most efficient and economical, as compared to all of the motor models that were designed and analyzed. Additionally, the application requirements 420 are based on the premise that electric motors are used in a wide range of applications, from desktop computers to airplanes. As such, each electric motor application demands a specific requirement of power, torque density, and speed range. Load profiles of the particular operating application are taken into account by the system to design the weighting factors for the objective function. The objective function of Eq. 1, thus converges the large number of motor models that were developed into one customized optimal solution that is for use in the intended motor application.

Figure 6:
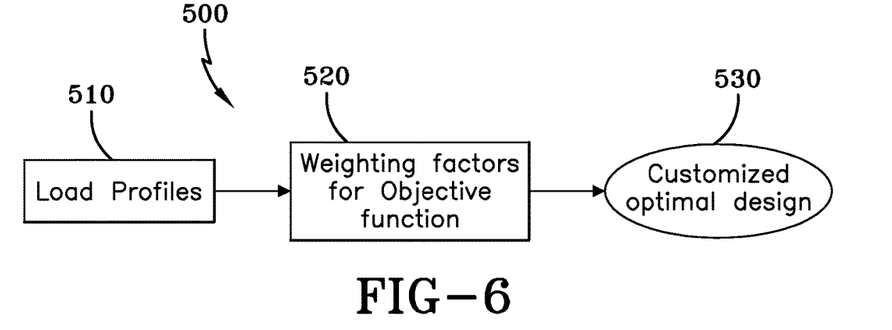
FIG. 6 is a flow diagram showing the customization of the motor design with an application requirement in accordance with the concepts of the present invention.

FIG. 6 shows the operational steps taken during a customization process 500 with regard to the application requirement 420. Initially, at step 510 a load profile is provided by a suitable computing system that is being used to carry out the simulation functions of the present invention. Specifically, the load profile includes various parameters associated with the operating requirements of the electric motor that are needed based on the intended application, including power, torque, speed, etc. Next, at step 520, the simulation system processes the load profile data from step 510 and generates or applies the weighting factors to the objective function, of Eq. 1. Once the weighting factors have been generated and applied to the objective function, they are processed by step 530, whereby the system generates a customized and optimized electric motor design.

Optimization of the electric motor design may be achieved using any suitable systematic approach that is used to make a decision with a common objective to find a balance between the specific task that the motor is to perform and the best possible manner in which to reduce the cost of manufacturing the motor.

Figure 7:
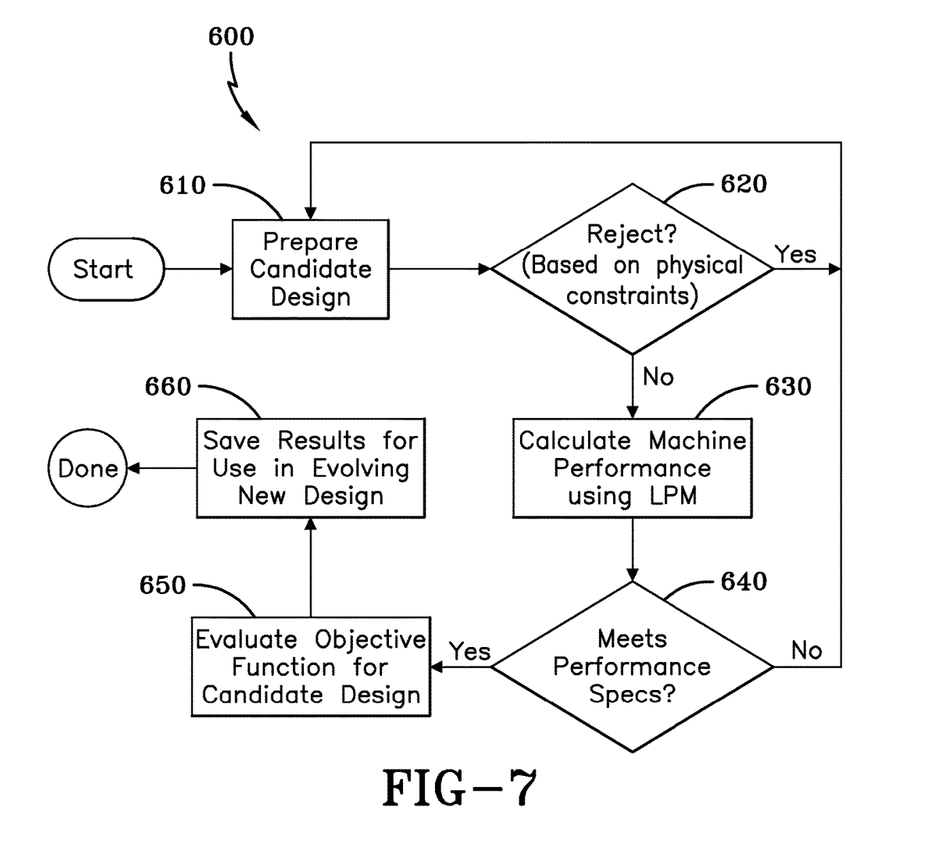
FIG. 7 is a flow diagram showing the overall multiphase electric motor optimization process in accordance with the concepts of the present invention.

Thus, by utilizing the 5D design method of present invention, optimization of the motor design can be performed using a fast motor design and customization process 600, as shown in FIG. 7. It should be appreciated that many types of optimization methods are available that can be used for such purpose. For example, differential evolution strategy (DES) is utilized to find the optimal design. Multiple parameters for the machine are varied within a range to find the optimal design. The iterative process and multiple parametric simulations are time consuming. Thousands of motor models are analyzed to obtain the best optimized motor model, which satisfies the objective function of Eq. 1. The optimized model is chosen for all further simulations.

In particular, the process 600 shown in FIG. 7 is carried out, such that at step 610, an electric motor design candidate is prepared. Next, at step 620 the prepared design candidate is evaluated to determine if it should be rejected based on predetermined constraints, such as physical or operational constraints. If the candidate design is rejected at step 620, then the process 600 returns to step 610, whereupon a new candidate design is developed. However, if the candidate design is not rejected at step 620, then the process 600 continues to step 630, where the performance of the electric motor design candidate is calculated using the lumped parameter model (LPM). Once the electric motor performance characteristics of the electric motor design candidate are calculated, the process 600 continues to step 640. At step 640, the process 600 determines whether the performance characteristics of the candidate motor design meet predetermined performance specifications or threshold values. If the performance characteristics of the candidate motor design do not meet or exceed the predetermined performance specifications or threshold values, the process 600 returns to step 610, whereupon a new design candidate is developed. However, if the performance characteristics of the candidate motor design do meet the predetermined performance specifications or threshold values at step 640, the process 600 continues to step 650. At step 650, the objective function (Eq. 1) is evaluated using the candidate design. Once evaluated, the candidate design is then saved at step 660 for use in evolving a new motor design.

Figure 8:
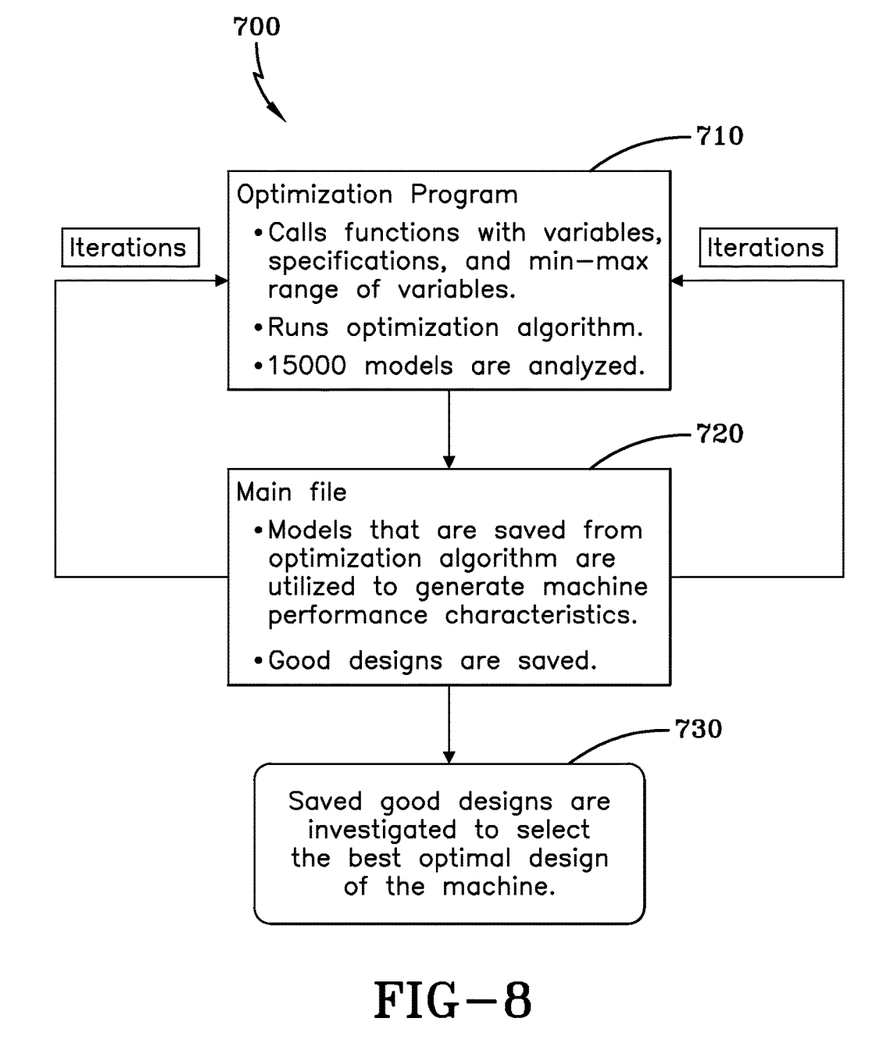
FIG. 8 is a flow diagram showing the operational steps of the 5-D modeling and customization process in accordance with the concepts of the present invention.

FIG. 8 shows an example of the 5D modeling and customization algorithm or process 700 used by the present invention. Initially, at step 710 of the process 700, an optimization program is started. During the optimization program, the process 700 calls functions with variables, specifications, and identifies the minimum-maximum range of the variables. In addition, the optimization program 700 executes the optimization algorithm 600 previously discussed with regard to FIG. 7. Furthermore, the optimization program 700 also analyzes a predetermined number of electric motor models, such as approximately 15,000 electric motor models for example, however any number may be used. Next, at step 720 a main file is created, which includes motor models that are saved from the optimization algorithm that are utilized to generate machine performance characteristics. In addition, at step 720 the motor designs that are acceptable or designated as "good" are saved or stored. Next, the process 700 performs one or more iterations of steps 710 and 720, until a motor design having predetermined motor characteristics is met. Finally, at step 730 the stored motor designs are evaluated in order to select the best optimal design of the electric motor.

Thus, the present invention provides a fast design and customization method for a multiphase electric motor for use in applications that require high reliability, high efficiency, and low cost, whereby the design and customization method may be embodied in hardware, software or a combination thereof. Unlike conventional design methods, which utilize finite element analysis (FEA) software, which has extremely high computation complexity, the method of motor design and customization of the present invention provides a fast customization of a multiphase electric motor design with only a +/−10% difference from the FEA design. In addition, the algorithm of the present invention can be used in developing a machine with respect to environmental factors, such as temperature and humidity, which is desirable.

Therefore, one advantage of the present invention is that a method for designing and customizing multiphase electric motors enables fast design and customization, while providing motor designs that have high reliability, high efficiency, and low cost. Another advantage of the present invention is that the method for designing and customizing multiphase electric motors takes into account environmental factors, including but not limited to temperature and humidity, for example, during the design process. Still another advantage of the present invention is that the method for designing and customizing multiphase electric motors is that conventional finite element analysis (FEA) software is not used during the design process, while achieving fast design and customization times. Yet another advantage of the present invention is that the method for designing and customizing multiphase electric motors does not require high complexity simulation software, such as FEA, while achieving fast design and customization of multiphase electric motor design, with only about +/−10% difference from that of FEA designs. Another advantage of the present invention is that the method for designing and customizing multiphase electric motors can be utilized to design advanced electrical motors, including but not limited to multiphase interior permanent magnet (IPM) motors, synchronous reluctance motors (SynRMs), and permanent magnet synchronous reluctance motors (PMa-SynRMs).

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A method for designing and customizing a multiphase electric motor comprising the steps of:
    selecting a candidate electric motor design;
    determining whether said candidate electric motor design meets one or more predetermined physical constraints;
    calculating operating performance parameters using a lumped parameter model (LPM) of said candidate electric motor design if said one or more predetermined physical constraints are met at said determining step;
    determining whether said performance parameters of said candidate electric motor design meet or exceed one or more predetermined operating performance values;
    customizing said candidate electric motor design based on an objective function of said candidate electric motor design if said one or more operating performance values are met or exceeded at aid second determining step, such that said objection function comprises:

$$\sqrt{(k_1 \times \text{Machine } loss^2 + k_2 \times \text{Machine } cost^2 + k_3 \times \text{Torque } ripple^2)},$$

wherein $k_1$, $k_2$, and $k_3$ are weighting coefficients;
    analyzing a plurality of predetermined number of electric motor models to determine acceptable electric motor designs to generate machine performance characteristics; and
    generating the electric motor design based on the machine performance characteristics and the predetermined number of electric motor models that meet predetermined motor characteristics.

2. The method of claim 1, wherein if said one or more predetermined physical constraints are not met at said first determining step, said selecting step is performed, whereby said candidate electric motor design is updated.

3. The method of claim 1, wherein if said one or more predetermined operating performance values are not met or exceed at said second determining step, said selecting step is performed, whereby said candidate electric motor design is updated.

4. The method of claim 1, further comprising:
    calculating the numerical value of k1, k2, and k3 based on one or more of monitoring results of a physical electric motor, environmental factors, market requirements, or application requirements.

5. The method of claim 1, wherein said operating performance parameters include a plurality of an air gap flux, a permanent magnet flux, an estimated saturation flux, an air gap reluctance, a flux barrier, a magnetic potential with respect to a q-axis, a magnetic potential with respect to a d-axis, a stator core reluctance, and a rotor core reluctance.

6. The method of claim 1, wherein said lumped parameter model is a magnetic equivalent circuit model.

7. The method of claim 1, wherein said stored candidate electric motor design is used in one or more subsequent iterations of said selecting step.

8. The method of claim 1, wherein said objective function is a penalty function.

* * * * *